United States Patent [19]

Howard et al.

[11] Patent Number: 5,442,726

[45] Date of Patent: Aug. 15, 1995

[54] OPTICAL FIBER STORAGE SYSTEM

[75] Inventors: Paul A. Howard, Midland; Cort Lansenderfer, Vienna, both of Va.

[73] Assignee: Hubbell Incorporated, Orange, Conn.

[21] Appl. No.: 199,607

[22] Filed: Feb. 22, 1994

[51] Int. Cl.[6] ............................................. G02B 6/36
[52] U.S. Cl. ................... 385/135; 385/134; 385/136; 385/137
[58] Field of Search .............. 385/14, 15, 88, 89, 385/134, 135, 136, 137, 139

[56] References Cited

U.S. PATENT DOCUMENTS

| | | | |
|---|---|---|---|
| 4,765,710 | 8/1988 | Burmeister et al. | 385/134 X |
| 4,824,196 | 4/1989 | Bylander | 385/134 X |
| 4,861,134 | 8/1989 | Alameel et al. | 385/135 |
| 4,898,448 | 2/1990 | Cooper | 385/135 X |
| 4,912,615 | 3/1990 | Bluband | 361/428 |
| 5,093,885 | 3/1992 | Anton | 385/134 |
| 5,129,030 | 7/1992 | Petrunia | 385/135 |
| 5,187,766 | 2/1993 | Finzel et al. | 385/135 |
| 5,247,603 | 9/1993 | Vidacovich et al. | 385/135 |
| 5,265,186 | 11/1993 | Fishkin et al. | 385/135 |
| 5,274,731 | 12/1993 | White | 385/135 |
| 5,283,851 | 2/1994 | Vergnolle | 385/135 |
| 5,363,466 | 11/1994 | Milanowski et al. | 385/135 |

FOREIGN PATENT DOCUMENTS

PCT/US91/-
03351 11/1991 WIPO .......................... 385/135 X

OTHER PUBLICATIONS

ADC Telecommunications, "Fiber Optic Signal Cross-Connect Systems", Fourth Edition, cover and pp. 23, 29, and 35 (Apr. 1992).

*Primary Examiner*—Brian Healy
*Attorney, Agent, or Firm*—Jerry M. Presson; John E. Holmes

[57] ABSTRACT

An optical fiber storage system is provided for use in an equipment rack containing at least one removable optical interface card. The storage system includes a holder for holding a length of optical fiber for connection to the optical interface card. The holder is mounted for movement between a closed position in which access to the optical fiber is prevented, and an open position allowing access to the optical fiber. An actuating device, which may comprise a portion of the optical interface card itself, is provided for causing the holder to move from the closed position to the open position upon withdrawal of the optical interface card.

20 Claims, 4 Drawing Sheets

OPTICAL FIBER STORAGE SYSTEM

FIELD OF THE INVENTION

The present invention relates to an optical fiber storage system for use in an electrical equipment rack containing a removable optical interface card. More specifically, the invention relates to an optical fiber storage system which includes a movable tray or holder for excess fiber that opens automatically to provide access to the excess fiber when the optical interface card is withdrawn for removal.

BACKGROUND OF THE INVENTION

Fiber optic technology is being used to an increasing extent in the communications industry to carry various types of signals and data that were previously transmitted by means of ordinary metallic conductors and coaxial cables. In telephone communications, for example, the use of fiber optic lines between central offices and individual residential and business subscribers has allowed for large increases in signal traffic and improved signal quality. However, since the subscriber equipment is generally designed for connection to conventional metallic conductors, interface circuitry must be provided to allow signals to pass between the subscriber equipment and the optical fiber lines. This circuitry is generally housed in outdoor telephone cabinets placed at or near the subscriber locations, with a single cabinet typically serving a large number of individual subscribers.

In telephone cabinets of the type described above, racks or banks of circuits known as channel units carry out analog-to-digital and digital-to-analog conversion between the telephone company lines and the individual subscriber lines. Other circuits, known as optical-electrical interface (OEI) circuits, are provided for converting the digitized electrical signals to optical signals which can be transmitted on the fiber optic lines, and for converting received optical signals to digital electrical signals. Typically, both the channel units and the OEI circuits are provided in the form of slide-out cards which can be easily removed from the equipment rack when repair or replacement is needed.

Because optical fibers are manufactured in standard lengths with connectors already attached at both ends, it is generally necessary to use a fiber that is somewhat longer than needed when making connections to an OEI card or other optical interface device. The excess fiber length allows the equipment rack containing the OEI card to be removed and replaced at a different location in the telephone cabinet, should this become necessary. However, the excess fiber must be stored in some way, and this can present problems in the design of equipment racks and telephone cabinets. Because optical fibers are fragile and cannot be bent or deformed in the same manner that electrical wires can, it is difficult to achieve compact storage.

In cases where the optical fiber is coupled directly to the front panel of the OEI card, the excess fiber has sometimes been allowed to remain exposed at the front of the equipment rack. Unfortunately, the exposed fiber obscures the various printed indicia, visual indicators and circuit board extractors that are usually provided on the front panel of the equipment rack, and occupies space on the front panel that might otherwise be devoted to other hardware. The presence of the fiber on the front panel also requires that additional space be provided in the interior of the telephone cabinet, thereby requiring a somewhat deeper cabinet that might otherwise be desired. The exposed fiber is also susceptible to damage because of its fragility, and can expose repair personnel to potential eye injury from laser light if the fiber becomes inadvertently detached from the connectors on the OEI card. Finally, the exposed fiber is undesirable from an aesthetic point of view, since it creates an unsightly appearance in the interior of the telephone cabinet.

In order to avoid the problems referred to above, various arrangements have been proposed for storing the excess optical fiber at locations other than along the front panel of the equipment rack. In one arrangement, for example, the excess fiber is stored in pivoting drawers or trays which are recessed into the front panel of the equipment rack. Although this is advantageous in that it removes the excess optical fiber from the front panel area of the equipment rack, there is an additional degree of difficulty in that the drawers are usually grouped together at a location spaced from the OEI cards themselves, and hence the field repairman must take the time to locate and open the proper drawer in order to withdraw the corresponding OEI card. This can be inconvenient and time-consuming when the telephone cabinet contains a large number of OEI cards and optical fiber storage drawers.

Another problem that occurs in removing OEI cards from telephone cabinets has to do with undesirable bending or flexing of the optical fibers attached to these cards. In some OEI card designs, the connectors which couple the optical fibers to the OEI card are located on the portion of the OEI card that is normally enclosed within the interior of the equipment rack, rather than being mounted in an exposed location on the front panel of the OEI card. The connectors are usually inclined in an upward and rearward direction, approximately the direction in which the optical fibers are routed after leaving the OEI card. Because of the partially upward connector orientation and the fact that the OEI cards are usually withdrawn by means of a horizontal sliding movement, the optical fibers are subjected to some degree of bending or flexing in the region near the connectors when the OEI card is removed. Repeated flexing can cause the optical fiber, which is by its nature very fragile, to become damaged or broken.

In summary, the prior art has failed to provide an arrangement for storing excess optical fiber which is convenient to use, occupies minimal space within the interior of an electrical cabinet, protects the fiber from damage or breakage, and does not interfere with the front panel of the equipment rack from either a functional or aesthetic point of view. The prior art has also failed to provide an arrangement which allows an OEI card to be removed from an equipment rack without causing undue bending or flexing of the optical fiber at its point of attachment to the OEI card.

SUMMARY OF THE INVENTION

A primary object of the present invention is to provide a storage system for optical fiber which allows convenient access to the fiber when the equipment to which it is connected requires testing or repair, but which protects the fiber from damage or breakage when such access is not required.

A further object of the invention is to provide a storage system for optical fiber which is suitable for installation in an equipment rack of a telephone cabinet, while occupying a minimum amount of space in the cabinet and interfering as little as possible with the front panel of the equipment rack.

A further object of the invention is to provide a storage system for optical fiber which allows the fiber to be accessed quickly and easily, and which places the fiber as close as possible to the equipment to which it is connected.

Still another object of the present invention is to provide a storage system for optical fiber which minimizes flexing and bending of the fiber when the equipment to which it is connected is removed for testing or repair.

The foregoing objects are substantially achieved by providing an automatic optical fiber storage system for use in an equipment rack containing at least one removable optical interface card. The storage system includes a holder for holding a length of optical fiber for connection to an optical interface card, with the holder being mounted for movement between a closed position in which access to the optical fiber is prevented and an open position allowing access to the fiber. The storage system also includes an actuating device for causing the holder to move from the closed position to the open position upon withdrawal of the optical interface card. By virtue of this arrangement, the optical fiber is made available automatically and only when needed, and is protected from damage or breakage at other times.

In accordance with a further aspect of the present invention, an equipment rack for use with optical fiber equipment is provided with the capability of storing optical fiber and automatically affording access to the optical fiber when needed. The equipment rack comprises a frame for receiving an optical interface card, and at least one optical interface card removably received in the frame and adapted to be connected to an optical fiber. A holder is located adjacent to the optical interface card in the frame for holding a length of optical fiber for connection to the optical interface card. The holder is movable between a closed position in which access to the optical fiber is prevented, and an open position allowing access to the optical fiber. The holder is mechanically coupled to the optical interface card so as to move from the closed position to the open position upon withdrawal of the optical interface card from the frame. By locating the holder adjacent to the optical interface card, a very simple mechanical coupling can be used to allow the holder to open when the optical interface card is withdrawn for removal. The task of the repairman is also simplified since withdrawal of the optical interface card and movement of the holder to the open position occur in a single motion, and stresses on the optical fiber are reduced since the coordinated motions of the optical interface card and holder reduce bending or flexing of the fiber at the connector locations.

In accordance with a still further aspect of the present invention, a method is provided for storing optical fiber in an equipment rack containing at least one removable optical interface card. The method comprises the steps of placing the optical fiber into a holder which is movable between a closed position and an open position; normally maintaining the holder in the closed position to prevent access to the optical fiber; withdrawing the optical interface card from the electrical equipment rack; and, simultaneously with such withdrawal of the optical interface card, moving the holder from the closed position to the open position in order to allow access to the optical fiber. By virtue of the foregoing method, access to the optical fiber is provided simultaneously with the withdrawal of the corresponding optical interface card, and bending or flexing of the optical fiber during withdrawal of the optical interface card is reduced or eliminated.

Other objects, advantages and novel features of the present invention will become apparent from the following detailed description which, when taken in conjunction with the annexed drawings, discloses a preferred embodiment of the invention.

BRIEF DESCRIPTION OF THE DRAWINGS

Referring now to the drawings, which form a part of the original disclosure.

DETAILED DESCRIPTION OF THE PREFERRED EMBODIMENT

Figure 1:
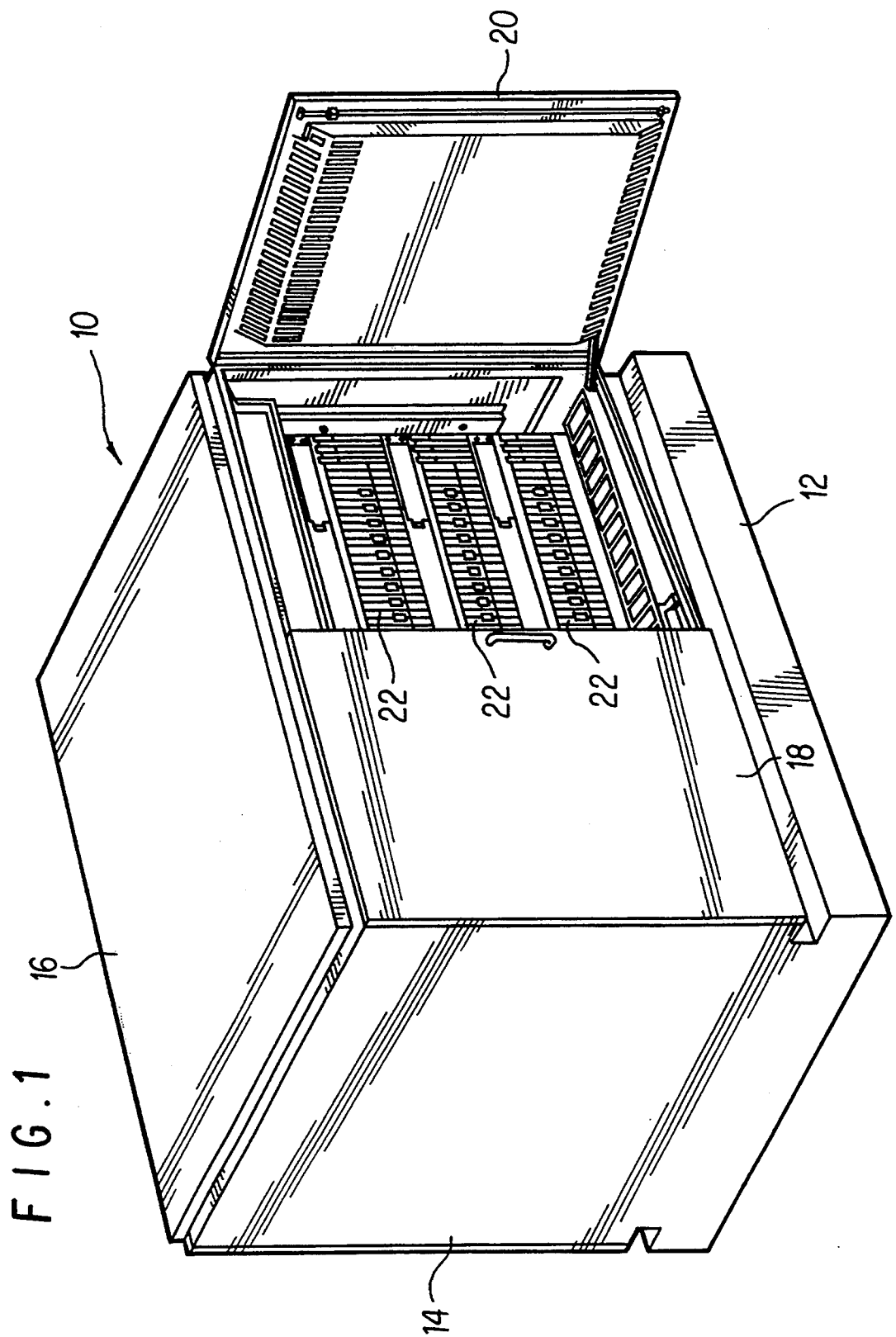
FIG. 1 is a perspective view of a telephone cabinet in which an optical fiber storage system constructed in accordance with the present invention has been installed.

FIG. 1 illustrates an outdoor telephone cabinet 10 in which an optical fiber storage system constructed in accordance with the present invention may be utilized. The cabinet 10 has a generally upright rectangular shape, with a base 12, side walls 14, a roof 16, and double doors 18 and 20 located at the front of the cabinet. A similar pair of double doors (not shown) is provided at the rear of the cabinet 10. The right-hand door 20 at the front of the cabinet 10 is shown in the open position to illustrate the electrical equipment housed in the interior of the cabinet. This equipment includes a number of equipment racks or channel banks 22, which are stacked in two vertical columns on shelves provided in the telephone cabinet 10.

Figure 2:
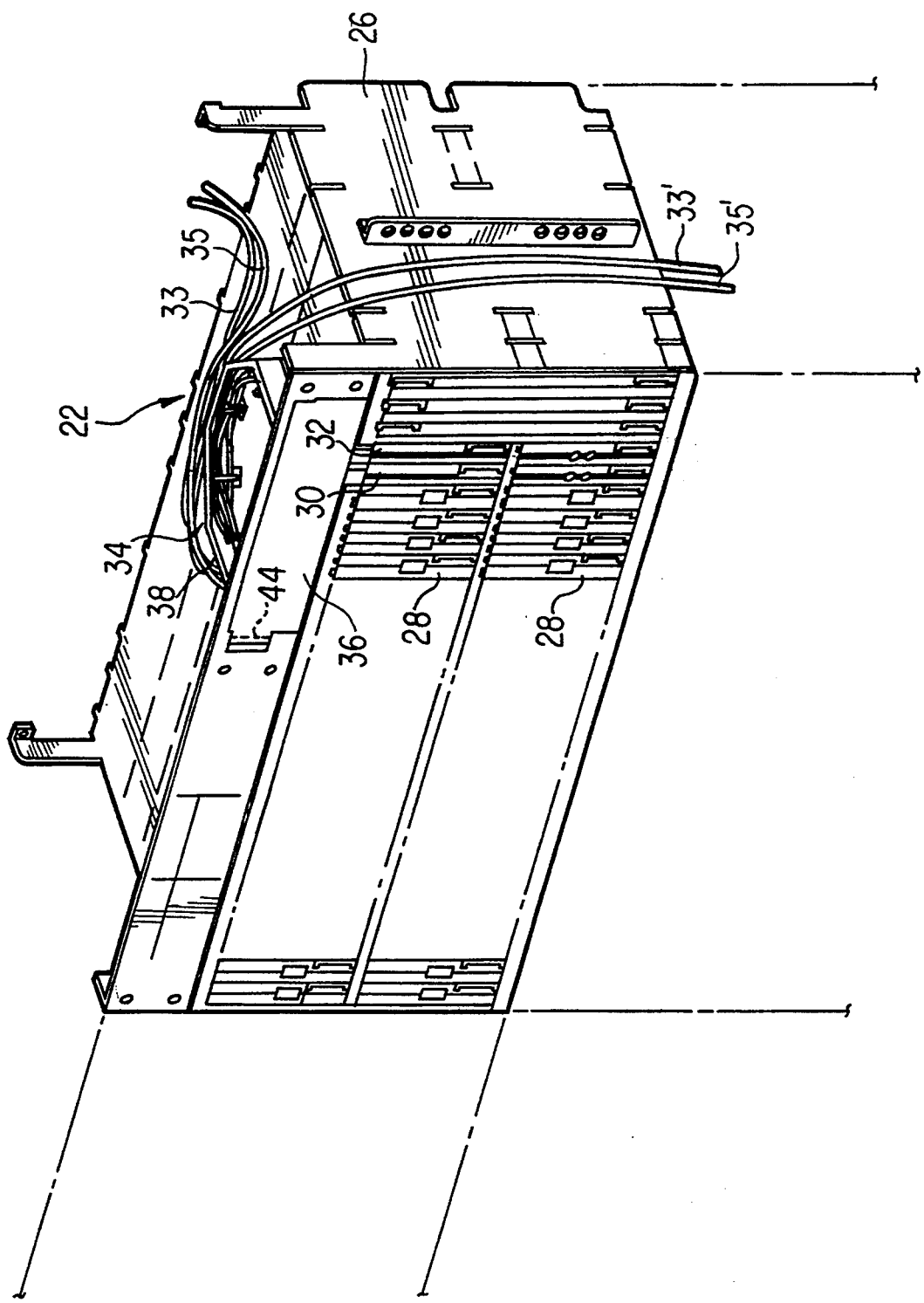
FIG. 2 is a perspective view of one of the equipment racks or channel banks that are housed in the telephone cabinet of FIG. 1.

FIG. 2 is a detailed perspective view of one of the equipment racks or channel banks 22. The equipment rack includes an aluminum frame 26 which contains slots or grooves for receiving a number of slide-out circuit cards in two horizontal rows, as shown. These circuit cards include a plurality of channel units 28 which provide digital-to-analog and analog-to-digital conversion between individual telephone subscriber lines and the optical fiber lines linking the telephone cabinet 10 to the local telephone switching office. Each channel bank also includes a pair of optical-electrical interface (OEI) cards 30 and 32 located next to each other near one end of the upper row of channel units 28. The purpose of the OEI cards is to convert the digital electrical data from the channel units 28 to modulated laser signals which can be transmitted through an optical fiber, and to convert received optical signals to digital electrical signals for processing by the channel units 28. Each OEI card 30 and 32 includes a pair of internal connectors for coupling the OEI card to input and output optical fibers, and hence a total of four optical fibers (two input fibers 33, 33' and two output fibers 35, 35') are connected to the pair of OEI cards 30 and 32. Each OEI card 30 and 32 is part of a separate fiber optic loop within the telephone cabinet 10, with the two loops providing redundancy in case of failure or disconnection. Within each loop, the OEI cards of different channel banks 22 in FIG. 1 are connected in a loop or daisy-chain by means of the optical fibers 33, 33' and 35, 35', with the output of each OEI card being connected to the input of an OEI card in the next successive channel bank.

Because optical fibers are manufactured in standard lengths with input and output connectors already attached, the lengths of the optical fibers which connect the OEI cards of successive channel banks 22 will generally be much longer than the actual distances between the OEI cards themselves. In accordance with the present invention, the excess fiber 40 (comprising intermediate portions of the four individual fibers 33, 33' and 35, 35') is stored in a pivoting holder or tray 34 which is mounted in the frame 26 and disposed horizontally at a position adjacent to and above the OEI cards 30 and 32. The holder includes a horizontally elongated door panel 36, and an optical fiber receiving portion 38 which is mounted to the rear face of the door panel 36. The excess optical fiber 40 from the OEI cards 30 and 32 is wound in loops and held in the receiving portion 38. The holder 34 is pivotable about a vertical axis 44 so as to be movable between a closed position and an open position, with the closed position being shown in FIG. 2.

Figure 3:
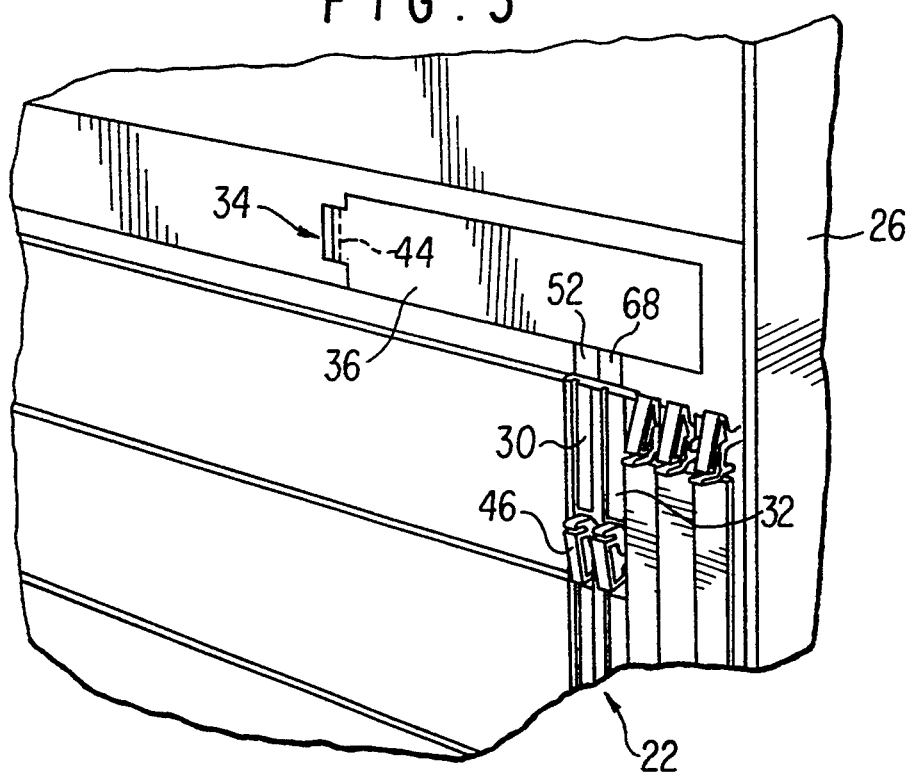
FIG. 3 is a perspective view of a portion of the front panel of the equipment rack shown in FIG. 2, with the optical interface cards and optical fiber holder shown in the closed positions.
Figure 4:
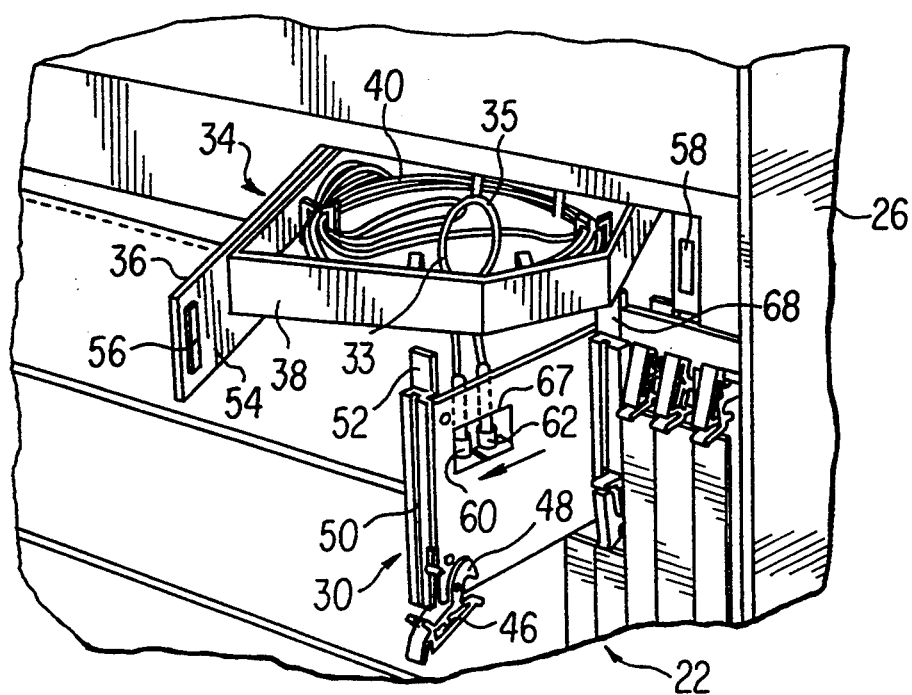
FIG. 4 is a perspective view similar to that of FIG. 3, with one of the optical interface cards shown partially removed and the optical fiber holder shown in the open position.

The operation of the holder 34 will be more readily understood from FIGS. 3 and 4, which are enlarged views of the upper right-hand portion of the front panel of the channel bank 22. Referring first to FIG. 3, the holder 34 is shown in the closed position with the door panel 36 lying substantially flush or parallel with respect to the front panel of the channel bank 22. In this position, the excess optical fiber is recessed behind the door panel 36 and thus does not obstruct or interfere with the front panels of the channel units 28 or OEI cards 30 and 32. The excess optical fiber is also protected from damage or breakage when the holder 34 is in the closed position. In FIG. 4, the left-hand OEI card 30 is shown partially removed from the channel bank 22. Removal of the OEI card 30 is accomplished by rotating an attached extractor 46 downwardly, which causes a claw-shaped portion 48 of the extractor to become disengaged from a horizontal bar or crossmember (not shown) of the channel bank frame 26. The OEI card 30 is then withdrawn by sliding the card horizontally toward the front of the equipment cabinet 10 as indicated by the arrow in FIG. 4. Withdrawal of the OEI card 30 causes the holder 34 to move automatically to the open position as shown in FIG. 4, in order to make the excess optical fiber 40 available to the repairman. This is preferably accomplished by providing the OEI card 30 with an upwardly projecting tab 52 which is located somewhat behind the plane of the OEI card front panel 50 as shown. In closed position of the holder 34, the tab 52 is positioned immediately behind the inner face 54 of the door panel 36, at a location near the right-hand edge of the door panel 36. Thus, when the OEI card 30 is withdrawn in the direction shown by the arrow in FIG. 4, the tab 52 will push outwardly against the inner face 54 of the door panel 36, causing the door panel 36 to pivot about the pivot axis 44. This causes the optical fiber receiving portion 38 of the holder 34 to be withdrawn from its recessed position behind the front panel of the channel bank 22, and to move to the position shown in FIG. 4. In order to maintain the holder 34 in the closed position of FIG. 3, a magnet 56 is affixed to the inner face of the door panel 36 at a point near the right-hand edge of the door panel as shown in FIG. 4. The magnet 56 is attracted to a steel plate 58 which is affixed to the frame 26 of the channel bank 22 at a position corresponding to that of the right-hand end of the door panel 36 when the holder 34 is in the closed position.

When the OEI card 30 and holder 34 are in the positions shown in FIG. 4, the input and output connectors 60 and 62 located inside the OEI card 30 are accessible and can be unscrewed in order to uncouple the corresponding input and output optical fibers 33 and 35 (i.e., two of the four fibers in the loop of excess fiber 40) from the OEI card 30. A cut-out 67 in the OEI card 30 allows the connectors 60 and 62 to be gripped from both sides by the repairman. Once the optical fibers 33 and 35 are uncoupled, the OEI card 30 may be completely removed from the channel bank 22 for testing, repair or replacement. Reinstallation of the OEI card is carried out by inserting the card partially into the corresponding slot in the channel bank 22, reattaching the optical fibers 33 and 35 to the connectors 60 and 62, and then fully inserting the OEI card 30 into the channel bank slot. At this point, the extractor 46 is engaged in order to lock the OEI card 30 in position, and the holder 34 is restored to the closed position by pivoting the door panel 36 so that the magnet 56 is brought into contact with the steel plate 58. This restores the components to the positions shown in FIG. 3.

As will be evident from FIGS. 3 and 4, the holder 34 provides a convenient way to store the excess optical fiber 40 at a protected location behind the front panel of the channel bank 22, while making the excess fiber immediately available when removal of the OEI card 30 is desired. Moreover, since the holder 34 is moved to the open position automatically when the OEI card 30 is withdrawn, no additional effort is required on the part of the repairman in order to locate or access the excess fiber. This can result in a significant reduction in time and effort in instances where many OEI cards are being removed for testing or replacement. The fact that the motions of the OEI card 30 and holder 34 occur simultaneously when the OEI card is withdrawn is also advantageous in that it minimizes bending or flexing of the optical fibers 33 and 35 in the region near the connectors 60 and 62. In other words, since the OEI card 30 and holder 34 move at the same time and at approximately the same speed (at least during the interval when the tab 52 is in abutting contact with the inner face 54 of the door panel 36), no significant bending or flexing of the optical fibers 33 and 35 occurs. This prolongs the life of the optical fibers 33 and 35 and makes it less likely that breakage will occur in the vulnerable region near the connectors 60 and 62. The same advantage can be gained during reinsertion of the OEI card 30, simply by re-inserting the OEI card 30 while simultaneously closing the door 36 to restore the holder 34 to the closed position.

In previous OEI card designs employing internal optical fiber connectors, the connectors have been oriented in such a way as to cause the optical fibers to emerge at an angle (i.e., upwardly and toward the rear of the OEI card) rather than vertically as shown in FIG. 4. This inclination was advantageous in that the optical fibers were required to undergo less bending in order to follow the desired path toward the interior of the channel bank. At the same time, however, the inclination of the connectors required the OEI card to be withdrawn from the channel bank by a greater distance before the connectors could be unscrewed to uncouple the optical fibers from the OEI card. In the present invention, the placement of the excess fiber holder 34 directly above the OEI card 30, together with the simultaneous motions of the OEI card 30 and holder 34 that occur when the OEI card is withdrawn, make it unnecessary for the connectors 60 and 62 to be disposed at an angle to reduce bending. Accordingly, the connectors 60 and 62 can be oriented vertically as illustrated in FIG. 4. In this orientation, uncoupling of the optical fibers 33 and 35 from the OEI card 30 is possible even when the OEI card 30 is withdrawn from the channel bank by a relatively small distance.

As noted previously, each of the channel banks 22 that is installed in the telephone cabinet 10 of FIG. 1 includes two OEI cards 30 and 32. The two OEI cards 30 and 32 are mounted alongside each other in the channel bank 22 as illustrated in FIG. 4. The second OEI card 32, whose construction is identical to that of the first OEI card 30, includes an upstanding tab 68 which is in confronting relation with the inner face 54 of the door panel 36 in the same manner as the tab 52 of the first OEI card 30. In this way, withdrawal of either of the OEI cards 30 or 32 will cause the holder 34 to move to the open position. The capacity of the holder 34 is sufficient to contain excess fiber 40 for both of the OEI cards 30 and 32. As noted previously, a total of four discrete fibers are required for two OEI cards, since each OEI card requires an input fiber 33 or 33' and an output fiber 35 or 35'. When a telephone cabinet employing many channel banks 22 is employed, as illustrated in FIG. 1, the number of OEI cards and holders may become quite large. In this situation, the physical juxtaposition of the OEI cards 30, 32 with the holders 34 is a significant advantage, since it eliminates the need for the repairman to locate the proper holder when preparing to remove an OEI card. In other words, since the OEI card and its corresponding holder are located adjacent to each other and are operated in unison, the task of matching each OEI card to its corresponding holder is performed automatically.

Figure 5:
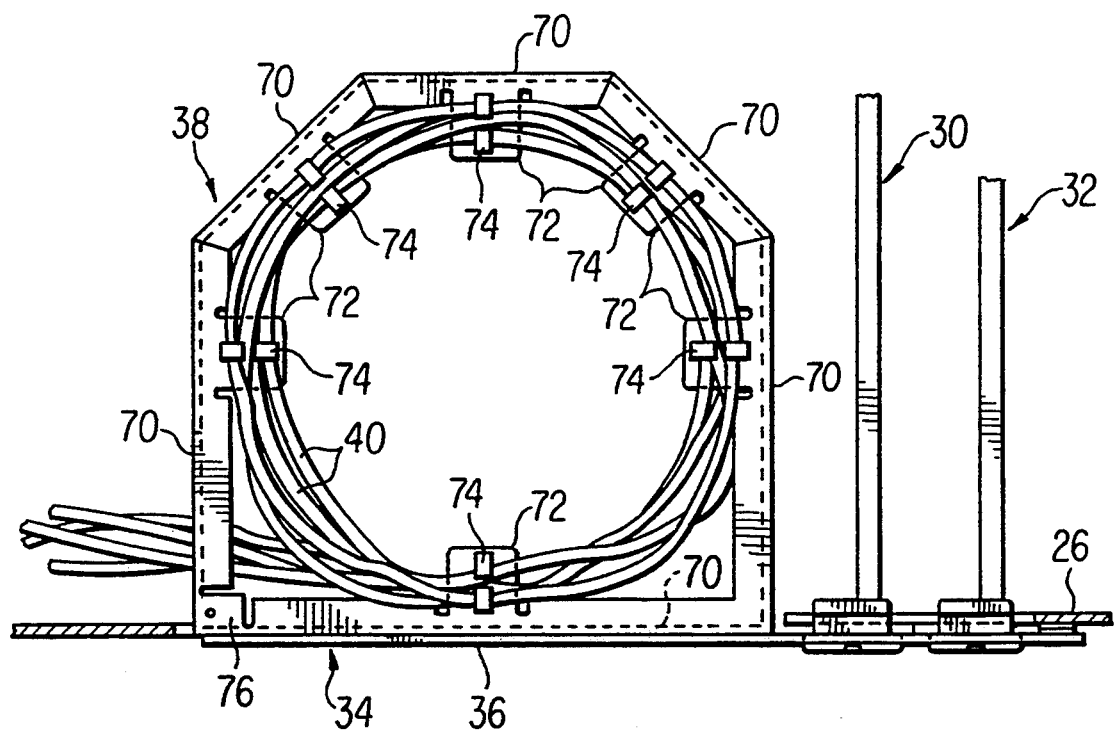
FIG. 5 is a top view of a portion of the equipment rack, illustrating the optical fiber holder and the optical interface cards in the closed positions.
Figure 6:
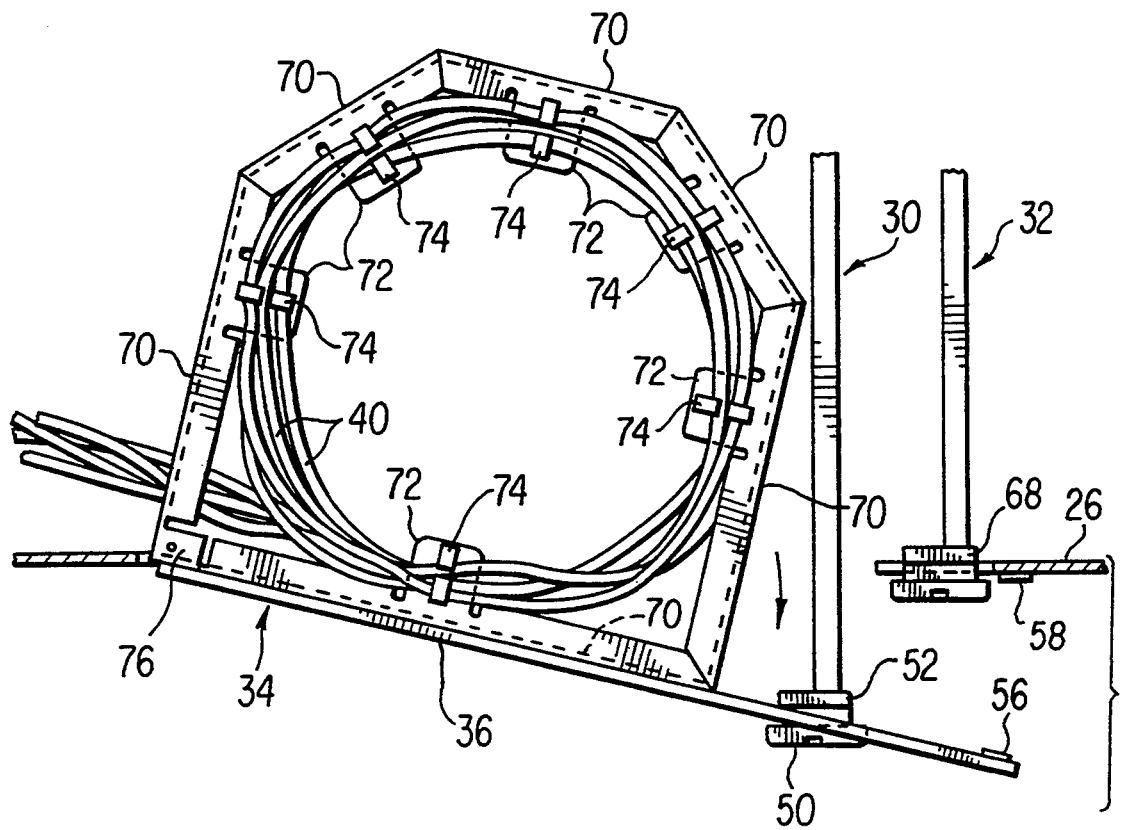
FIG. 6 is a top view similar to that of FIG. 5, with the optical fiber holder shown partially open and one of the optical interface cards shown partially removed.

Further details of the optical fiber holder 34 may be appreciated by reference to FIGS. 5 and 6, which are top views of the holder 34 in the closed and open positions, respectively. The OEI cards 30 and 32 are shown somewhat larger than actual size relative to the holder 34 in FIGS. 5 and 6, and optical fiber connections to the OEI cards 30 and 32 have been deleted for clarity. The optical fiber receiving portion 38 of the holder 34 is a six-sided metal weldment which is open at the top and bottom, and which includes circumferential side walls for receiving one or more loops of the excess optical fiber 40. Metal tabs 72 formed integrally with the side walls 70 provide attachment points for plastic clips 74 which secure the loops or windings of the optical fiber 40 in the holder 34. The horizontal dimensions of the optical fiber receiving portion 38 are such that the loops or windings of the optical fiber 40 have a radius well in excess of the minimum bend radius of the optical fiber, in order to prevent undue stress on the fiber. In addition, the clips 74 are of adequate size to secure several loops or windings of the optical fiber 40, so that optical fibers of various lengths can be used if desired. In order to define the vertical pivot axis 44 of FIG. 2, the optical fiber receiving portion 38 includes a hinge 76 at one corner. The hinge serves to pivotably attach the optical fiber receiving portion 30 to the frame 26 of the channel bank 22. The hinge 76 thus provides the attachment point between the holder 34 as a whole and the frame 26 of the channel bank 22.

If desired, the open structure 38 of FIGS. 5 and 6 may be replaced with a drawer or tray having a closed bottom, and in that event the clips 74 may no longer be needed to secure the loops or windings of the optical fiber 44. However, the open structure 38 shown in FIGS. 5 and 6 is advantageous in that it does not obstruct the flow of cooling air through the interior of the channel banks 22 when the holder 34 is in the closed position. This is particularly important when a number of channel banks 22 are stacked vertically in a telephone cabinet 10, as illustrated in FIG. 1. In instances where it is desired to utilize a tray or drawer having closed bottom in lieu of the open structure 38 shown in FIGS. 5 and 6, the bottom of the tray or drawer may be provided with holes or perforations in order to promote the desired air flow.

While only one exemplary embodiment has been chosen to illustrate the present invention, it will be understood by those skilled in the art that various changes and modifications can be made therein. All such modifications are intended to fall within the spirit and scope of the invention as defined in the appended claims.

What is claimed is:

1. An optical fiber storage system for use in an equipment rack containing at least one removable optical interface card, comprising:
    a holder for holding a length of optical fiber for connection to an optical interface card, said holder being mounted for movement between a closed position in which access to said optical fiber is prevented and an open position allowing access to said optical fiber; and
    an actuating device for causing said holder to move from said closed position to said open position automatically in response to withdrawal of said optical interface card.

2. An optical fiber storage system as claimed in claim 1, wherein said holder is mounted for pivoting movement between said closed position and said open position.

3. An optical fiber storage system as claimed in claim 2, wherein said holder includes an elongated door panel adapted to lie substantially parallel to a front panel of said equipment rack when said holder is in the closed position, and wherein said pivoting movement of said holder occurs about a pivot axis located proximate to a first end of said elongated door panel.

4. An optical fiber storage system for use in an equipment rack containing at least one removable optical interface card, comprising:
    a holder for holding a length of optical fiber for connection to an optical interface card, said holder being mounted for movement between a closed position in which access to said optical fiber is prevented and an open position allowing access to said optical fiber; and an actuating device for causing said holder to move from said closed position to said open position upon withdrawal of said optical interface card; and further wherein:

said holder is mounted for pivoting movement between said closed position and said open position;

said holder includes an elongated door panel adapted to lie substantially parallel to a front panel of said equipment rack when said holder is in the closed position, said pivoting movement of said holder occurring about a pivot axis located proximate to a first end of said elongated door panel; and said actuating device comprises a tab adapted to be brought into contact with a rear face of said door panel at a location proximate to a second end of said door panel opposite to said first end.

5. An optical fiber storage system as claimed in claim 4, wherein said tab is carried by an optical interface card located adjacent to said holder in said equipment rack.

6. An optical fiber storage system as claimed in claim 5, further comprising a latching device for maintaining said holder in the closed position, said latching device being located proximate to said second end of said door panel.

7. An optical fiber storage system as claimed in claim 6, wherein said latching device comprises a magnetic latching device.

8. An optical fiber storage system for use in an equipment rack containing at least one removable optical interface card, comprising:

a holder for holding a length of optical fiber for connection to an optical interface card, said holder being mounted for movement between a closed position in which access to said optical fiber is prevented and an open position allowing access to said optical fiber; and an actuating device for causing said holder to move from said closed position to said open position upon withdrawal of said optical interface card; and further wherein:

said holder is mounted for pivoting movement between said closed position and said open position;

said holder includes an elongated door panel adapted to lie substantially parallel to a front panel of said equipment rack when said holder is in the closed position, said pivoting movement of said holder occurring about a pivot axis located proximate to a first end of said elongated door panel; and said holder further includes an optical fiber receiving portion connected to said door panel for receiving said length of optical fiber.

9. An optical fiber storage system as claimed in claim 8, wherein said optical fiber receiving portion comprises circumferential walls for receiving one or more loops or windings of said optical fiber.

10. An optical fiber storage system as claimed in claim 9, further comprising a plurality of clips carried by said circumferential walls for securing said loops or windings of said optical fiber.

11. An optical fiber storage system as claimed in claim 10, wherein said optical fiber receiving portion is substantially open above and below said circumferential walls.

12. An equipment rack for use with optical fiber equipment, comprising:

a frame for receiving at least one optical interface card;

at least one optical interface card removably received in said frame and adapted to be connected to an optical fiber; and a holder located adjacent to said optical interface card in said frame for holding a length of optical fiber for connection to said optical interface card, said holder being movable between a closed position in which access to said optical fiber is prevented and an open position allowing access to said optical fiber, and said holder being mechanically coupled to said optical interface card so as to move from said closed position to said open position automatically in response to withdrawal of said optical interface card from said frame.

13. An equipment rack as claimed in claim 12, wherein said holder is mounted for pivoting movement between said closed position and said open position.

14. An equipment rack as claimed in claim 13, wherein said holder includes an elongated door panel adapted to lie substantially parallel to a front panel of said optical interface card when said holder is in the closed position, and wherein said pivoting movement of said holder occurs about a pivot axis located proximate to a first end of said elongated door panel.

15. An equipment rack for use with optical fiber equipment, comprising:

a frame for receiving at least one optical interface card;

at least one optical interface card removably received in said frame and adapted to be connected to an optical fiber; and a holder located adjacent to said optical interface card in said frame for holding a length of optical fiber for connection to said optical interface card, said holder being movable between a closed position in which access to said optical fiber is prevented and an open position allowing access to said optical fiber, and said holder being mechanically coupled to said optical interface card so as to move from said closed position to said open position upon withdrawal of said optical interface card from said frame; and further wherein:

said holder is mounted for pivoting movement between said closed position and said open position;

said holder includes an elongated door panel adapted to lie substantially parallel to a front panel of said optical interface card when said holder is in the closed position, said pivoting movement of said holder occurring about a pivot axis located proximate to a first end of said elongated door panel; and said holder is mechanically coupled to said optical interface card by a tab carried by said optical interface card and adapted to be brought into contact with a rear face of said door panel at a location proximate to a second end of said door panel opposite to said first end.

16. An equipment rack as claimed in claim 15, further comprising a latching device for maintaining said holder in the closed position, said latching device being located proximate to said second end of said door panel.

17. An equipment rack as claimed in claim 16, wherein said latching device comprises a magnetic latching device.

18. A method for storing optical fiber in an equipment rack containing at least one removable optical interface card to which said optical fiber is connected, comprising the steps of:

placing said optical fiber into a holder which is movable between a closed position and an open position;

normally maintaining said holder in said closed position to prevent access to said optical fiber;

withdrawing said optical interface card from said equipment rack; and responsive to such withdrawal of said optical interface card, automatically causing said holder to move from said closed position to said open position in order to allow access to said optical fiber.

19. A method for storing excess optical fiber as claimed in claim 18, wherein the step of moving said holder from said closed position to said open position is carried out by bringing a portion of said optical interface card into contact with said holder during withdrawal of said optical interface card.

20. A method for storing excess optical fiber in an equipment rack containing at least one removable optical interface card to which said optical fiber is connected, comprising the steps of:

placing said optical fiber into a holder which is movable between a closed position and an open position;

normally maintaining said holder in said closed position to prevent access to said optical fiber;

withdrawing said optical interface card from said equipment rack; and simultaneously with such withdrawal of said optical interface card, moving said holder from said closed position to said open position in order to allow access to said optical fiber;

wherein the step of moving said holder from said closed position to said open position is carried out by bringing a portion of said optical interface card into contact with said holder during withdrawal of said optical interface card; and wherein the step of normally maintaining said holder in the closed position comprises the step of magnetically latching said holder in the closed position.

* * * * *